US012403386B2

(12) United States Patent
Zhou

(10) Patent No.: US 12,403,386 B2
(45) Date of Patent: Sep. 2, 2025

(54) MAGNETIC TYPE CARD BOX ASSEMBLY

(71) Applicant: Shenzhen Youlequ Trading Co., Ltd., Shenzhen (CN)

(72) Inventor: Meng Zhou, Shenzhen (CN)

(73) Assignee: Shenzhen Youlequ Trading Co., Ltd., Shenzhen (CN)

( * ) Notice: Subject to any disclaimer, the term of this patent is extended or adjusted under 35 U.S.C. 154(b) by 0 days.

(21) Appl. No.: 19/019,473

(22) Filed: Jan. 14, 2025

(65) Prior Publication Data

US 2025/0153031 A1 May 15, 2025

(51) Int. Cl.
*A63F 1/06* (2006.01)
*H01F 7/02* (2006.01)

(52) U.S. Cl.
CPC .......... *A63F 1/062* (2013.01); *A63F 2250/60* (2013.01); *H01F 7/0252* (2013.01)

(58) Field of Classification Search
CPC .................. A63F 1/062; A63F 2250/60; A63F 2003/00943; A63F 2003/00485; H01F 7/0252; B65D 5/244; B65D 2313/04
See application file for complete search history.

(56) References Cited

U.S. PATENT DOCUMENTS

D1,003,361 S * 10/2023 Zhou ............................ D21/392
D1,057,558 S * 1/2025 Wu .............................. D21/392
2006/0022022 A1 2/2006 Bowman
2006/0244348 A1* 11/2006 Richied .................. B42F 17/08 312/108
2007/0246884 A1* 10/2007 Jones ........................ A63F 1/14 273/149 R
2008/0124954 A1 5/2008 Wei Chen
2016/0119668 A1 4/2016 Jung
2023/0277918 A1* 9/2023 Alonso Perez ........ B65D 81/36 273/285
2024/0123324 A1* 4/2024 Alonso Perez ........ B65D 5/244
2025/0011037 A1* 1/2025 Rice .................. B65D 21/0208

OTHER PUBLICATIONS

Dueling Guard (published by Commander Jaime on Jun. 12, 2024 at https://www.youtube.com/watch?v=cdsphRAxV7o) (Year: 2024).*

* cited by examiner

*Primary Examiner* — Michael D Dennis
(74) *Attorney, Agent, or Firm* — Hemisphere Law, PLLC; Zhigang Ma

(57) ABSTRACT

A magnetic type card box assembly is provided, including a card box main body. The card box main body includes a front side plate, a rear side plate, a left side plate and a right side plate arranged successively around a first cavity. A first magnet and a second magnet are fixedly arranged in the front side plate and the rear side plate respectively. A third magnet or a first iron sheet is fixedly arranged in the left side plate, and a fourth magnet or a second iron sheet is fixedly arranged in the right side plate. At least one adherence box is detachably magnetically attached onto the left side plate or the right side plate. The magnetic type card box assembly further includes a lower bottom plate arranged below the first cavity.

15 Claims, 6 Drawing Sheets

MAGNETIC TYPE CARD BOX ASSEMBLY

TECHNICAL FIELD

The present disclosure relates to the technical field of card boxes, more particularly to a magnetic type card box assembly.

BACKGROUND

Cards are mainly classified into game, collection and display types. Card box is a type of box configured to place this type of cards, which meanwhile eases carriage and provides a protection function. At present, the card box generally is composed of a box cover and a box body. The box body is formed by splicing and pasting a plurality of cardboards and films. An accommodation cavity configured to place cards is formed in the box body. When the box cover is put on, a storage function is achieved. During the game process of the game cards of the existing technologies, there is generally a special card or game prop provided. If the special card is placed among the large number of common cards, it will take a user some time to look for it; especially when there is a game prop provided, the game prop needs to be placed into other accommodation containers when the game is ended, which is easy to lose. Therefore, a magnetic type card box assembly is provided to solve the above problems.

SUMMARY

It is one object of the present disclosure to provide a magnetic type card box assembly, so as to solve the problems of the existing card boxes that there is no separate space to place a special card or game prop.

The magnetic type card box assembly provided by the present disclosure may be implemented through the following technical scheme.

A magnetic type card box assembly provided by the present disclosure includes a card box main body configured to place a plurality of common cards, and at least one adherence box magnetically attached onto a side surface of the card box main body. The at least one adherence box is configured to place a special card and/or a game prop.

Herein, the card box main body includes a front side plate, a rear side plate, a left side plate and a right side plate arranged successively around a first cavity. The first cavity is a rectangular cavity with openings on two ends. A first magnet and a second magnet are fixedly arranged in the front side plate and the rear side plate respectively. A third magnet or a first iron sheet is fixedly arranged in the left side plate, and a fourth magnet or a second iron sheet is fixedly arranged in the right side plate. The at least one adherence box is detachably magnetically attached onto the left side plate or the right side plate. The card box main body further includes a lower bottom plate arranged below the first cavity. The lower bottom plate forms with the first cavity a second cavity with an opening on one end. The card box main body further includes a cover plate detachably arranged above the second cavity. A fifth magnet and a sixth magnet are fixedly arranged in the cover plate respectively. The fifth magnet and the sixth magnet correspond to the second magnet and the first magnet respectively in position.

In one embodiment, the front side plate further includes a front inner side plate and a front outer side plate fixedly arranged on an outer side of the front inner side plate. The first magnet is fixedly arranged between the front inner side plate and the front outer side plate. The rear side plate further includes a rear inner side plate and a rear outer side plate fixedly arranged on an outer side of the rear inner side plate. The rear inner side plate is arranged opposite to the front inner side plate, and the second magnet is fixedly arranged between the rear inner side plate and the rear outer side plate.

In one embodiment, the front inner side plate is formed with a first notch and the front outer side plate is formed with a second notch. The second notch is matched with the first notch in position and size respectively. The rear inner side plate is formed with a third notch and the rear outer side plate is formed with a fourth notch. The fourth notch is matched with the third notch in position and size respectively.

In one embodiment, the left side plate further includes a left inner side plate fixedly arranged between the front inner side plate and the rear inner side plate, and a left outer side plate fixedly arranged on an outer side of the left inner side plate. Four third magnets are arranged on four corners between the left inner side plate and the left outer side plate respectively.

In one embodiment, the right side plate includes a right inner side plate arranged fixedly between the front inner side plate and the rear inner side plate and opposite to the left inner side plate, and a right outer side plate fixedly arranged on an outer side of the right inner side plate. Four fourth magnets are arranged on four corners between the right inner side plate and the right outer side plate respectively.

In one embodiment, the lower bottom plate includes a lower inner bottom plate fixedly arranged below a third cavity with openings on two ends that is enclosed by the front inner side plate, the rear inner side plate, the left inner side plate and the right inner side plate, and a lower outer bottom plate fixedly arranged on an outer side of the lower inner bottom plate.

In one embodiment, the first magnet, the second magnet, the third magnet and the fourth magnet all employ thin magnets.

In one embodiment, the front outer side plate, the rear outer side plate, the left outer side plate, the right outer side plate and the lower outer bottom plate are fixedly arranged on outer sides of the front inner side plate, the rear inner side plate, the left inner side plate, the right inner side plate and the lower inner bottom plate respectively by means of a sewing process or a glue adhesion process.

In one embodiment, the cover plate includes a cover plate main body arranged as a dual-layer structure and detachably arranged above the second cavity, and a fifth magnet and a sixth magnet fixedly arranged in the cover plate main body respectively. The fifth magnet and the sixth magnet correspond to the corresponding second magnet and the corresponding first magnet respectively in position.

In one embodiment, the fifth magnet and the sixth magnet both employ thin magnets.

In one embodiment, the cover plate main body includes a first connection plate, a second connection plate, an upper cover plate main body and a third connection plate arranged successively. The first connection plate has one end fixedly connected to the lower bottom plate. The first connection plate and the second connection plate are detachably overlaid on the rear side plate, and the fifth magnet is fixedly arranged in the second connection plate. The upper cover plate main body is detachably overlaid above the second cavity. The third connection plate is detachably overlaid on the front side plate, and the sixth magnet is fixedly arranged in the third connection plate.

In one embodiment, a first crease is arranged between the first connection plate and the second connection plate; a second crease is arranged between the second connection plate and the upper cover plate main body; and a third crease is arranged between the upper cover plate main body and the third connection plate.

In one embodiment, the adherence box includes an accommodation cavity arranged as a hollow rectangular cavity and configured to place a special card, a first cover body detachably engaged on the accommodation cavity, and a plurality of seventh magnets fixedly arranged on the accommodation cavity respectively. The adherence box is detachably attached onto the left side plate or the right side plate by means of the plurality of seventh magnets.

In one embodiment, the accommodation cavity and the first cover body both employ a transparent material.

In one embodiment, a side edge of the accommodation cavity is formed with a plurality of engaging grooves; and a side edge of the first cover body is provided with a plurality of engaging blocks corresponding to the plurality of engaging grooves. The plurality of engaging blocks are matched with the corresponding engaging grooves respectively.

In one embodiment, four corners of the accommodation cavity are formed with accommodation grooves respectively. Four seventh magnets are fixedly arranged in the corresponding accommodation grooves respectively.

In one embodiment, the adherence box includes an outer box body arranged as a closed hollow rectangular cavity, an inner box body fixedly arranged in the outer box body and configured to place a prop, and a plurality of eighth magnets fixedly arranged between the outer box body and the inner box body. The adherence box is detachably attached onto the left side plate or the right side plate by means of the plurality of eighth magnets.

Compared with the existing technology, the magnetic type card box assembly provided by the present disclosure has the following beneficial effects.

According to the magnetic type card box assembly provided by the present disclosure, a special card and/or a game prop are/is arranged in the adherence box, then the adherence box is magnetically attached onto the left side plate or right side plate, whereby to effectively solve the problems of the existing card boxes that there is no separate space to place the special card or game prop. Meanwhile, the present disclosure is simple in structure and is convenient to use, which to some extent improves the user experience and the degree of satisfaction.

BRIEF DESCRIPTION OF THE DRAWINGS

For a better understanding of the technical scheme of the embodiments of the present disclosure, accompanying drawings required to be used in the embodiments are simply illustrated below. It should be understood that the accompanying drawings described below merely illustrate some embodiments of the present disclosure and thus should not be viewed as a limit to the scope of the present disclosure. For the ordinary skill in the field, other relevant accompanying drawings may be obtained without creative effort according to these accompanying drawings

Figure 1:
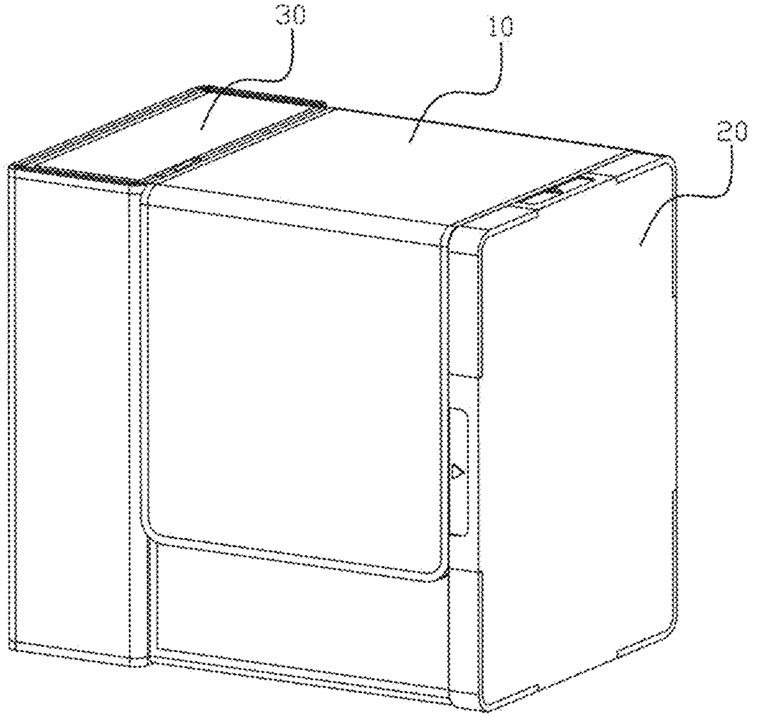
FIG. 1 is a structure diagram of a magnetic type card box assembly of the present disclosure.

Reference numerals in the drawings are described as below. 10, card box main body; 11, front side plate; 111, front inner side plate; 1111, first notch; 112, front outer side plate; 1121, second notch; 113, first magnet; 12, rear side plate; 121, rear inner side plate; 1211, third notch; 122, rear outer side plate; 1221, fourth notch; 123, second magnet; 13, left side plate; 131, left inner side plate; 132, left outer side plate; 133, third magnet; 134, first iron sheet; 14, right side plate; 141, right inner side plate; 142, right outer side plate; 143, fourth magnet; 144, second iron sheet; 15, lower bottom plate; 151, lower inner bottom plate; 152, lower outer bottom plate; 16, cover plate; 161, cover plate main body; 1611, first connection plate; 1612, second connection plate; 1613, upper cover plate main body; 1614, third connection plate; 17, first crease; 18, second crease; 19, third crease; 162, fifth magnet; 163, sixth magnet; 20, first adherence box; 21, accommodation cavity; 211, engaging groove; 212, accommodation groove; 22, first cover body; 221, engaging block; 23, seventh magnet; 30, second adherence box; 31, outer box body; 311, main outer box body; 312, second cover body; 32, inner box body; and 33, eighth magnet.

DETAILED DESCRIPTION OF THE EMBODIMENTS

The purpose, technical scheme and advantages of the embodiments of the present disclosure will become more clearly understood from the clear and complete description of the technical scheme of the embodiments of the present disclosure below taken in conjunction with accompanying drawings in the embodiments of the present disclosure. Obviously, the embodiments described hereinafter are simply part embodiments of the disclosure, rather than all of the embodiments. Generally, the assemblies of the embodiments of the present disclosure described and shown in the drawings herein can be deployed and designed in a variety of arrangements.

Therefore, the following detailed description for the embodiments of the present disclosure provided in the drawings is not intended to limit the scope of protection of the present disclosure, but merely to illustrate the selected embodiments of the present disclosure. All other embodiments obtained by the ordinary skill in the art based on the embodiments in the present disclosure without creative work are intended to be included in the scope of protection of the present disclosure.

Figure 2:
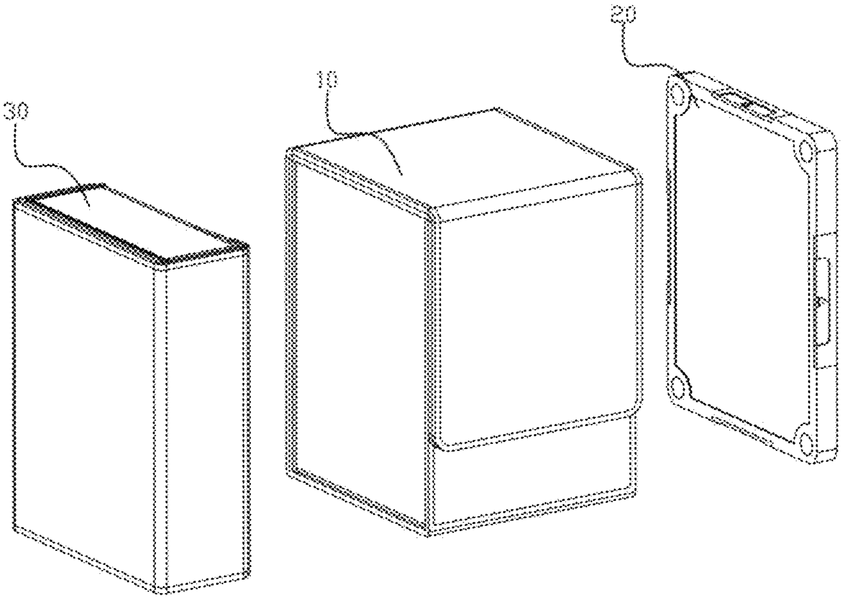
FIG. 2 is an exploded structure diagram of the magnetic type card box assembly of the present disclosure shown in FIG. 1, including a card box main body, a first adherence box and a second adherence box.

Referring to FIG. 1 and FIG. 2, a magnetic type card box assembly provided by the present disclosure mainly includes a card box main body 10, a first adherence box 20 and a second adherence box 30. The card box main body 10 is a closed hollow rectangular cavity configured to place a plurality of common cards. The first adherence box 20 and the second adherence box 30 are magnetically attached on two opposite sides of the card box main body 10 respectively. The first adherence box 20 is configured to place a special card. The second adherence box 30 is configured to place a game prop.

Referring to FIG. 1 to FIG. 5, in the present embodiment, the card box main body 10 includes a front side plate 11, a rear side plate 12, a left side plate 13, a right side plate 14, a lower bottom plate 15 and a cover plate 16. The front side plate 11, the left side plate 13, the rear side plate 12 and the right side plate 14 are arranged successively and cooperatively form a first cavity 110, the first cavity 110 being a rectangular cavity with openings on two ends. The lower bottom plate 15 is fixedly arranged below the first cavity 110. The cover plate 16 is detachably arranged above the first cavity 110, whereby to conveniently place the common cards into the first cavity 110 or remove the common cards from the first cavity 110.

Figure 3:
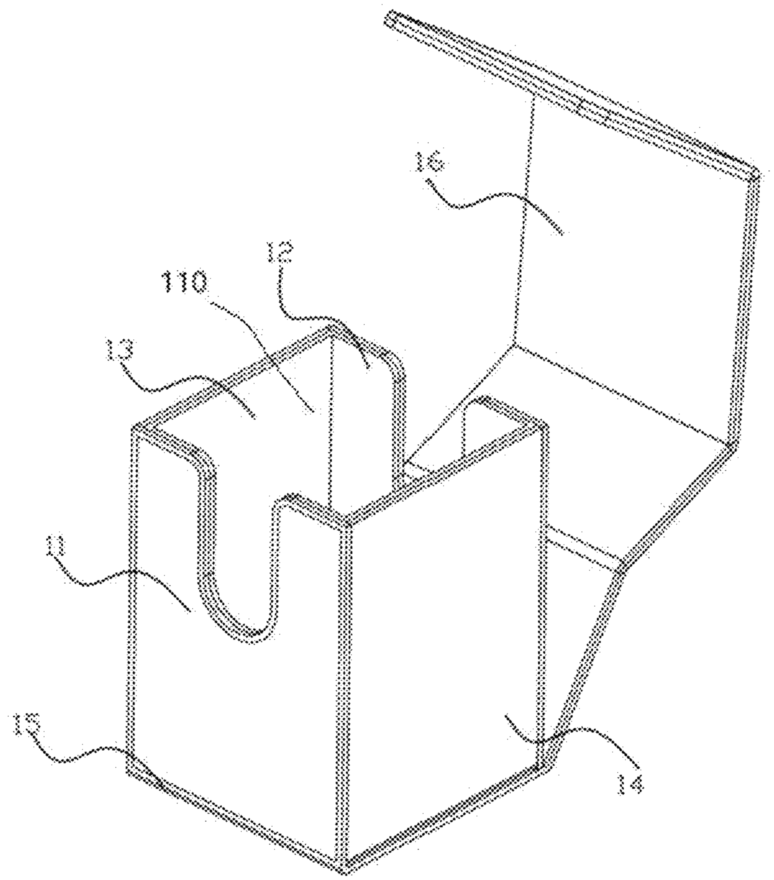
FIG. 3 is a structure diagram of the card box main body shown in FIG. 2 in an open state.
Figure 4:
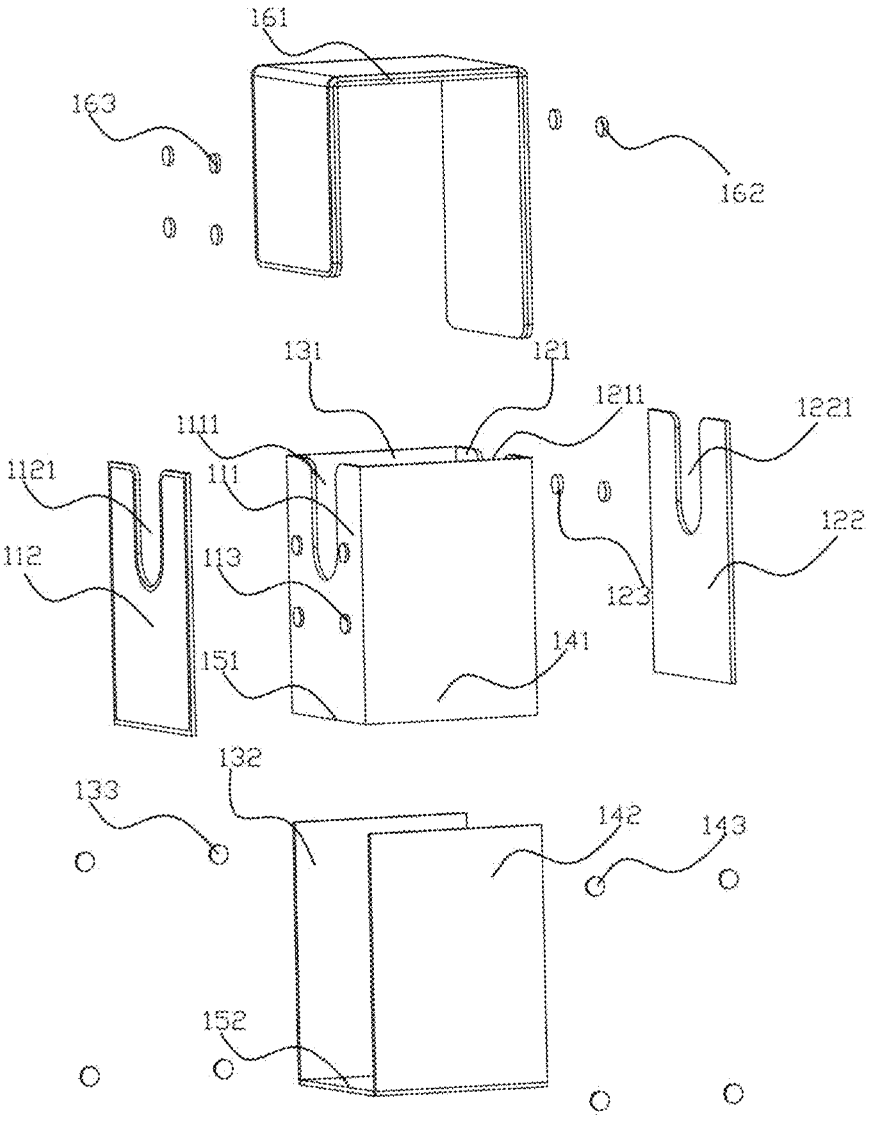
FIG. 4 is a structure diagram of a first embodiment of the card box main body shown in FIG. 2, including a cover plate.
Figure 5:
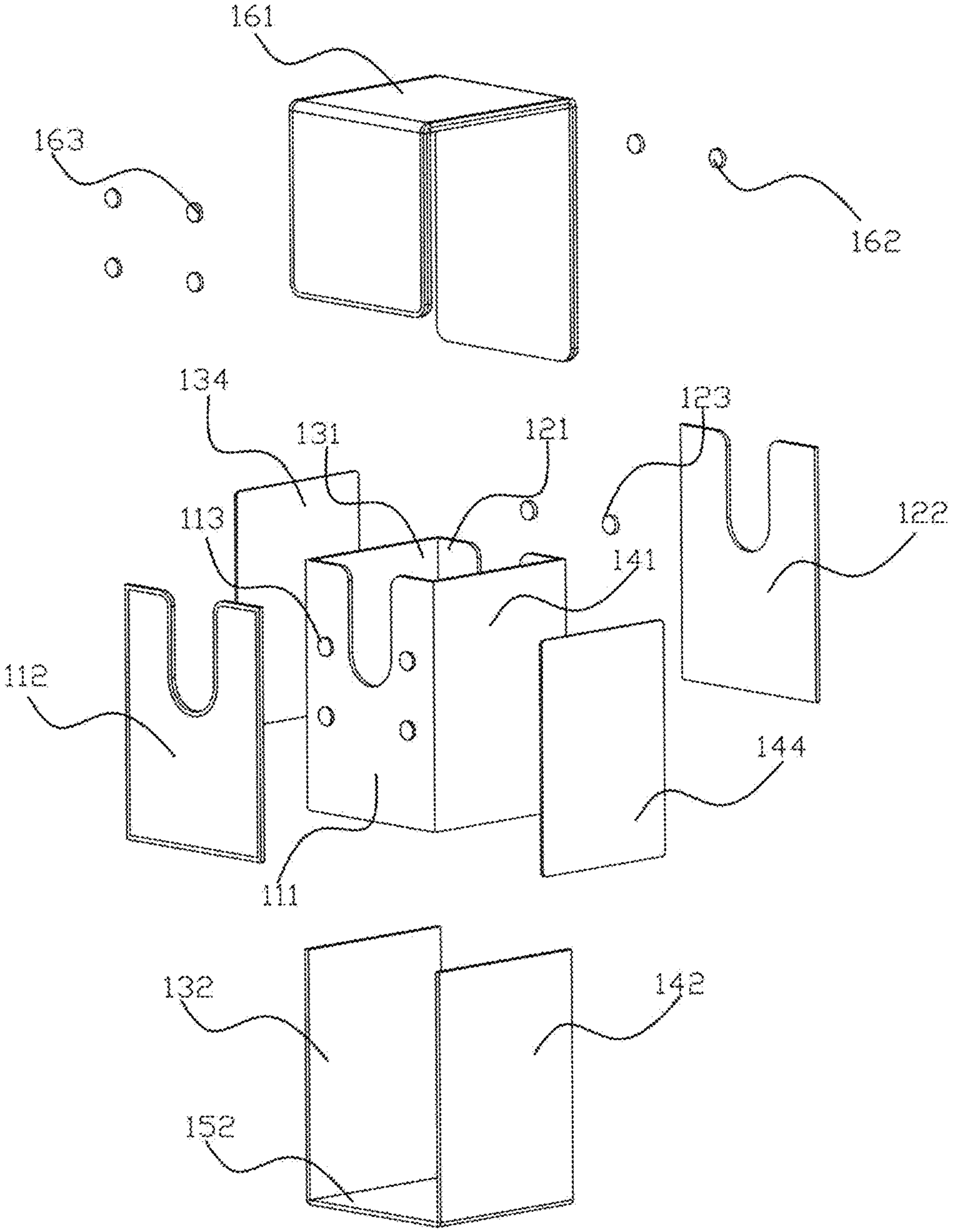
FIG. 5 is a structure diagram of a second embodiment of the card box main body shown in FIG. 2, including a cover plate.

Referring to FIG. 3 to FIG. 5, the front side plate 11 includes a front inner side plate 111, a front outer side plate 112 and at least one first magnet 113. The front outer side plate 112 is fixedly arranged on an outer side of the front inner side plate 111. The at least one first magnet 113 is fixedly arranged between the front inner side plate 111 and the front outer side plate 112, whereby being capable of magnetically attracting the cover plate 16. In particular, the front inner side plate 111 is formed with a first notch 1111, and the front outer side plate 112 is formed with a second notch 1121 corresponding to the first notch 1111. The second notch 1121 is matched with the first notch 1111 in size, whereby the common cards inside the card box main body 10 can be taken out conveniently from front to back via the second notch 1121 and the first notch 1111 in sequence. In the present embodiment, four first magnets 113 are fixedly arranged between the front inner side plate 111 and the front outer side plate 112 respectively. Preferably, the first magnet 113 employs a thin magnet. In other embodiments, the quantity of the first magnet 113 may be one, two, three or any other plural number, which depends on actual needs. In particular, the front outer side plate 112 is fixedly arranged on the outer side of the front inner side plate 111 by means of a sewing process or a glue adhesion process.

Referring to FIG. 3 to FIG. 5, the rear side plate 12 includes a rear inner side plate 121, a rear outer side plate 122 and at least one second magnet 123. The rear inner side plate 121 is arranged opposite to the front inner side plate 111. The rear outer side plate 122 is fixedly arranged on an outer side of the rear inner side plate 121. The at least one second magnet 123 is fixedly arranged between the rear inner side plate 121 and the rear outer side plate 122, whereby being capable of magnetically attracting the cover plate 16. In particular, the rear inner side plate 121 is formed with a third notch 1211, and the rear outer side plate 122 is formed with a fourth notch 1221 corresponding to the third notch 1211. The fourth notch 1221 is matched with the third notch 1211 in size, whereby the common cards inside the card box main body 10 can be taken out conveniently from back to front via the fourth notch 1221 and the third notch 1211 in sequence. In the present embodiment, two second magnets 123 are fixedly arranged between the rear inner side plate 121 and the rear outer side plate 122 respectively. Preferably, the second magnet 123 employs a thin magnet. In other embodiments, the quantity of the second magnet 123 may be one, three, four or any other plural number, which depends on actual needs. In particular, the rear outer side plate 122 is fixedly arranged on the outer side of the rear inner side plate 121 by means of a sewing process or a glue adhesion process.

Referring to FIG. 3 and FIG. 4, in the present embodiment, the left side plate 13 includes a left inner side plate 131, a left outer side plate 132 and four third magnets 133. The left inner side plate 131 is fixedly arranged between the front inner side plate 111 and the rear inner side plate 121. The left outer side plate 132 is fixedly arranged on an outer side of the left inner side plate 131. The four third magnets 133 are arranged on four corners between the left inner side plate 131 and the left outer side plate 132 respectively. By means of the four third magnets 133, the first adherence box 20 or the second adherence box 30 may be magnetically attracted. In particular, the left outer side plate 132 is fixedly arranged on the outer side of the left inner side plate 131 by means of a sewing process or a glue adhesion process. The third magnet 133 employs a thin magnet.

Referring to FIG. 3 and FIG. 5, in the present embodiment, the left side plate 13 includes a left inner side plate 131, a left outer side plate 132 and a first iron sheet 134. The left inner side plate 131 is fixedly arranged between the front inner side plate 111 and the rear inner side plate 121. The left outer side plate 132 is fixedly arranged on an outer side of the left inner side plate 131. The first iron sheet 134 is arranged between the left inner side plate 131 and the left outer side plate 132. By means of the first iron sheet 134, the first adherence box 20 or the second adherence box 30 may be magnetically attracted.

Referring to FIG. 3 and FIG. 4, in the present embodiment, the right side plate 14 includes a right inner side plate 141, a right outer side plate 142 and four fourth magnets 143. The right inner side plate 141 is arranged fixedly between the front inner side plate 111 and the rear inner side plate 121 and opposite to the left inner side plate 131. The right outer side plate 142 is fixedly arranged on an outer side of the right inner side plate 141. The four fourth magnets 143 are arranged on four corners between the right inner side plate 141 and the right outer side plate 142 respectively. By means of the four fourth magnets 143, the first adherence box 20 or the second adherence box 30 may be magnetically attracted. In particular, the right outer side plate 142 is fixedly arranged on the outer side of the right inner side plate 141 by means of a sewing process or a glue adhesion process. The fourth magnet 143 employs a thin magnet.

Referring to FIG. 3 and FIG. 5, in the present embodiment, the right side plate 14 includes a right inner side plate 141, a right outer side plate 142 and a second iron sheet 144. The right inner side plate 141 is arranged fixedly between the front inner side plate 111 and the rear inner side plate 121 and opposite to the left inner side plate 131. The right outer side plate 142 is fixedly arranged on an outer side of the right inner side plate 141. The second iron sheet 144 is arranged between the right inner side plate 141 and the right outer side plate 142. By means of the second iron sheet 144, the first adherence box 20 or the second adherence box 30 may be magnetically attracted.

Referring to FIG. 3 to FIG. 5, in the present embodiment, the lower bottom plate 15 includes a lower inner bottom plate 151 and a lower outer bottom plate 152. The lower inner bottom plate 151 is fixedly arranged below the front inner side plate 111, the rear inner side plate 121, the left inner side plate 131 and the right inner side plate 141. The lower outer bottom plate 152 is fixedly arranged on an outer side of the lower inner bottom plate 151. In particular, the lower outer bottom plate 152 is fixedly arranged on the outer side of the lower inner bottom plate 151 by means of a sewing process or a glue adhesion process.

Referring to FIG. 3 to FIG. 5, the cover plate 16 includes a cover plate main body 161, at least one fifth magnet 162 and at least one sixth magnet 163. The cover plate main body 161 is of a dual-layer structure and is moveably arranged above the first cavity 110. The at least one fifth magnet 162 and the at least one sixth magnet 163 are fixedly arranged in the cover plate main body 161 respectively. The fifth magnet 162 corresponds to the corresponding second magnet 123 in position. The sixth magnet 163 corresponds to the corresponding first magnet 113 in position. By means of the mutual magnetic attraction between the first magnet 113 and the sixth magnet 163 and the mutual magnetic attraction between the second magnet 123 and the fifth magnet 162, the cover plate main body 161 may be detachably magnetically attached above the first cavity 110. In the present embodiment, two fifth magnets 162 correspond to the corresponding second magnets 123 in position, and four sixth magnets 163 correspond to the corresponding first magnets 113 in position.

Figure 6:
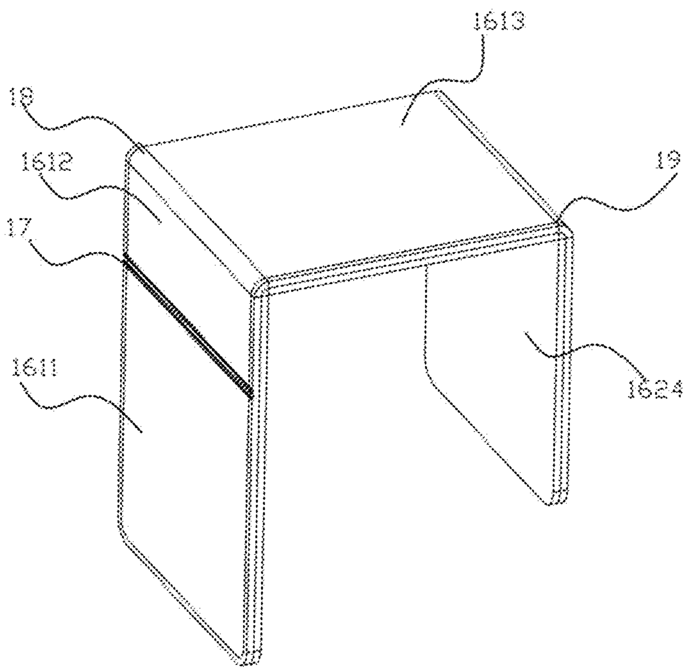
FIG. 6 is a structure diagram of an upper cover plate shown in FIG. 4 or FIG. 5.

Referring to FIG. 6, in the present embodiment, the cover plate main body 161 includes a first connection plate 1611, a second connection plate 1612, an upper cover plate main body 1613 and a third connection plate 1614 arranged successively. The first connection plate 1611 has one end fixedly connected to the lower bottom plate 15; the first connection plate 1611 and the second connection plate 1612 are detachably overlaid on the rear side plate 12; and at least one fifth magnet 162 is fixedly arranged in the second connection plate 1612. The upper cover plate main body 1613 is detachably overlaid above the first cavity 110. The third connection plate 1614 is detachably overlaid on the front side plate 11, and at least one the sixth magnet 163 is fixedly arranged in the third connection plate 1614. In particular, a first crease 17 is arranged between the first connection plate 1611 and the second connection plate 1612, wherein the second connection plate 1612 is capable of bending relative to the first connection plate 1611 by means of the first crease 17. A second crease 18 is arranged between the second connection plate 1612 and the upper cover plate main body 1613, wherein the upper cover plate main body 1613 is capable of bending relative to the second connection plate 1612 by means of the second crease 18. A third crease 19 is arranged between the upper cover plate main body 1613 and the third connection plate 1614, wherein the third connection plate 1614 is capable of bending relative to the upper cover plate main body 1613 by means of the third crease 19.

Figure 7:
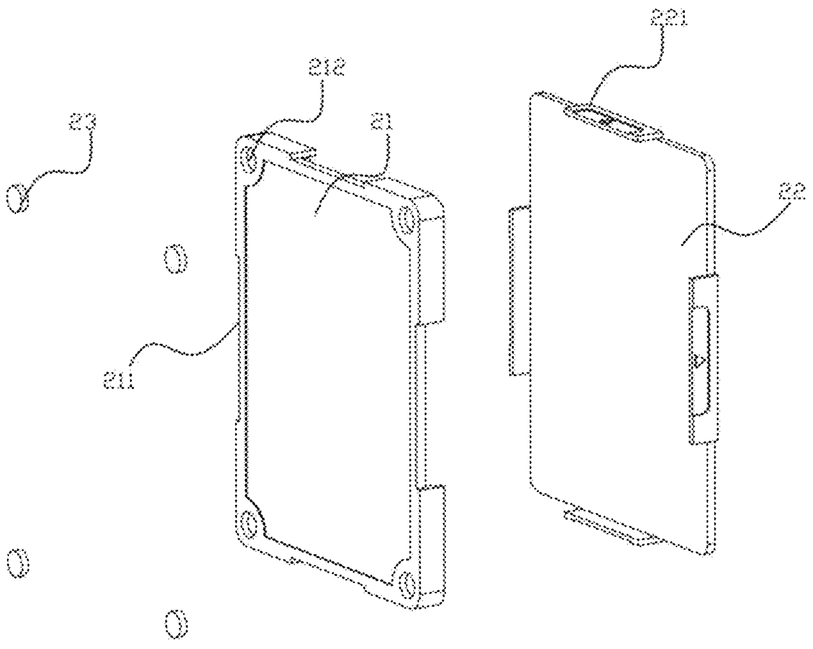
FIG. 7 is an exploded structure diagram of the first adherence box shown in FIG. 2.

Referring to FIG. 1, FIG. 2 and FIG. 7, the adherence box 20 includes an accommodation cavity 21, a first cover body 22 and a plurality of seventh magnets 23. The accommodation cavity 21 is a hollow rectangular cavity and is configured to place a special card. The first cover body 22 is detachably engaged on the accommodation cavity 21 and can be opened relative to the accommodation cavity 21, whereby a special card can be placed into the accommodation cavity 21 or removed from the accommodation cavity 21 conveniently. The plurality of seventh magnets 23 are fixedly arranged on the accommodation cavity 21 respectively. The accommodation cavity 21 is detachably attached onto the left side plate 13 or the right side plate 14 by means of the plurality of seventh magnets 23. In particular, the accommodation cavity 21 and the first cover body 22 both employ a transparent material. A side edge of the accommodation cavity 21 is formed with a plurality of engaging grooves 211. A side edge of the first cover body 22 is provided with a plurality of engaging blocks 221 corresponding to the plurality of engaging grooves 211. By means of the fitting between the engaging blocks 221 and the engaging grooves 211, a detachable connection is achieved between the accommodation cavity 21 and the first cover body 22. Four corners of the accommodation cavity 21 are formed with accommodation grooves 212 respectively, and four seventh magnets 23 are fixedly arranged in the corresponding accommodation grooves 212 respectively.

Figure 8:
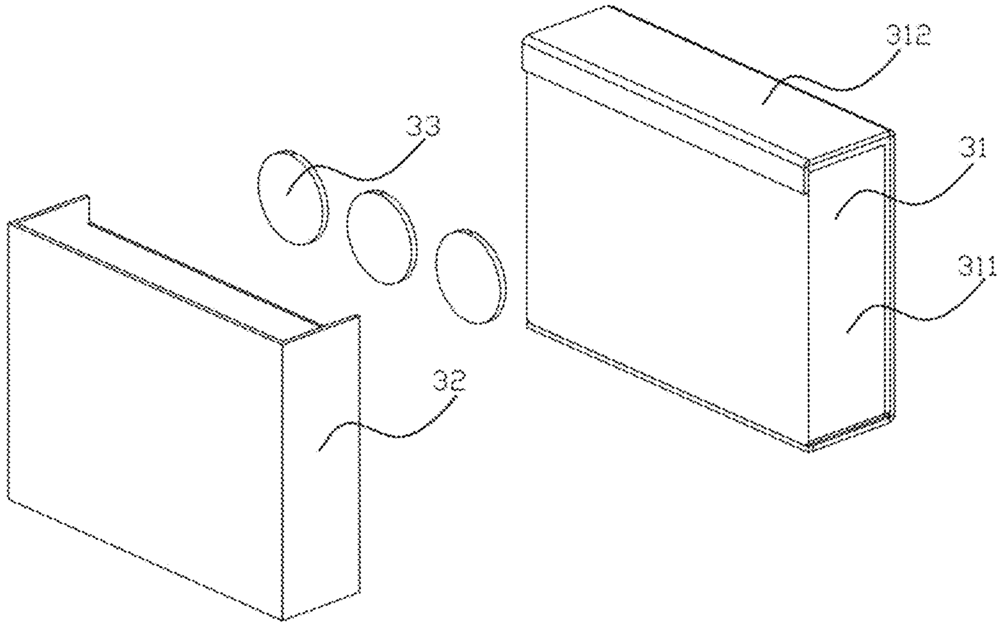
FIG. 8 is an exploded structure diagram of the second adherence box shown in FIG. 2.

Referring to FIG. 1, FIG. 2 and FIG. 8, in the present embodiment, the second adherence box 30 includes an outer box body 31, an inner box body 32 and a plurality of eighth magnets 33. The outer box body 31 is a closed hollow rectangular cavity. The inner box body 32 is fixedly arranged in the outer box body 31 and a prop can be placed in the inner box body 32. The plurality of eighth magnets 33 are fixedly arranged between the outer box body 31 and the inner box body 32. The second adherence box is detachably attached onto the left side plate 13 or the right side plate 14 by means of the plurality of eighth magnets 33. In particular, the outer box body 31 includes a main outer box body 311 and a second cover body 312. The second cover body 312 is detachably arranged on the main outer box body 311.

It is to be noted that the specific operating process of the magnetic type card box assembly of the present disclosure is as follows. First, common cards are placed in the card box main body 10, a special card is placed in the first adherence box 20, and a prop is placed in the second adherence box 30. Then, the first adherence box 20 and/or the second adherence box 30 are/is attached onto the left side plate 13 and the right side plate 14 of the card box main body 10, by means of magnetic attraction.

Each technical feature of the above embodiments may be combined arbitrarily. For concise description, not all possible combinations of each technical feature of the above embodiments have been described. However, the combinations of these technical features shall be considered to fall into the scope of the present disclosure if no conflict is incurred.

The above embodiments merely describe several implementations of the present disclosure. Although the description is relatively concrete and detailed, it cannot thus be understood as a limit to the patent scope of the present disclosure. It should be noted that for the ordinary skill in the art, various changes and improvements can be made to the present disclosure without departing from the spirit of the present disclosure, and these changes and improvements all are intended to be included in the scope of protection of the present disclosure. Therefore, the protection scope of the present disclosure shall be defined by the claims appended herein.

What is claimed is:

1. A magnetic type card box assembly, comprising:

a card box main body configured to place a plurality of first cards; the card box main body comprising:

a front side plate, a left side plate, a rear side plate and a right side plate arranged successively and cooperatively forming a first cavity;

a first magnet and a second magnet being fixedly arranged in the front side plate and the rear side plate respectively, a third magnet or a first iron sheet being fixedly arranged in the left side plate, and a fourth magnet or a second iron sheet being fixedly arranged in the right side plate;

a lower bottom plate arranged below the first cavity;

a cover plate detachably arranged above the first cavity, and covering the front side plate and the rear side plate;

a fifth magnet and a sixth magnet being fixedly arranged in the cover plate respectively, wherein the fifth magnet and the sixth magnet correspond to the second magnet and the first magnet respectively in position; and at least one transparent adherence box configured to place a second card and/or a game prop, the at least one transparent adherence box being detachably magnetically attached onto the card box main body, and exposed outside the cover plate, wherein the adherence box comprises an accommodation cavity arranged as a hollow rectangular cavity and configured to place the second card, a first cover body detachably engaged on the accommodation cavity, and a plurality of seventh magnets fixedly arranged on the accommodation cavity respectively, the adherence box being detachably attached onto the left side plate or the right side plate by means of the plurality of seventh magnets.

2. The magnetic type card box assembly according to claim 1, wherein the front side plate further comprises a front inner side plate and a front outer side plate fixedly arranged on an outer side of the front inner side plate, the first magnet being fixedly arranged between the front inner side plate and the front outer side plate; and wherein the rear side plate further comprises a rear inner side plate and a rear outer side plate fixedly arranged on an outer side of the rear inner side plate, the rear inner side plate being arranged opposite to the front inner side plate, and the second magnet being fixedly arranged between the rear inner side plate and the rear outer side plate.

3. The magnetic type card box assembly according to claim 2, wherein the front inner side plate is formed with a first notch and the front outer side plate is formed with a second notch, the second notch being matched with the first notch in position and size respectively; and wherein the rear inner side plate is formed with a third notch and the rear outer side plate is formed with a fourth notch, the fourth notch being matched with the third notch in position and size respectively.

4. The magnetic type card box assembly according to claim 2, wherein the left side plate further comprises a left inner side plate fixedly arranged between the front inner side plate and the rear inner side plate, and a left outer side plate fixedly arranged on an outer side of the left inner side plate; and wherein four third magnets are arranged on four corners between the left inner side plate and the left outer side plate respectively.

5. The magnetic type card box assembly according to claim 4, wherein the right side plate comprises a right inner side plate arranged fixedly between the front inner side plate and the rear inner side plate and opposite to the left inner side plate, and a right outer side plate fixedly arranged on an outer side of the right inner side plate; and wherein four fourth magnets are arranged on four corners between the right inner side plate and the right outer side plate respectively.

6. The magnetic type card box assembly according to claim 5, wherein the lower bottom plate comprises a lower inner bottom plate fixedly arranged below the front inner side plate, the rear inner side plate, the left inner side plate and the right inner side plate, and a lower outer bottom plate fixedly arranged on an outer side of the lower inner bottom plate.

7. The magnetic type card box assembly according to claim 6, wherein the front outer side plate, the rear outer side plate, the left outer side plate, the right outer side plate and the lower outer bottom plate are fixedly arranged on outer sides of the front inner side plate, the rear inner side plate, the left inner side plate, the right inner side plate and the lower inner bottom plate respectively by means of a sewing process or a glue adhesion process.

8. The magnetic type card box assembly according to claim 1, wherein the cover plate comprises a cover plate main body arranged as a dual-layer structure and detachably arranged above the first cavity, and the fifth magnet and the sixth magnet are fixedly arranged in the cover plate main body respectively.

9. The magnetic type card box assembly according to claim 8, wherein the cover plate main body comprises a first connection plate, a second connection plate, an upper cover plate main body and a third connection plate arranged successively; wherein the first connection plate has one end fixedly connected to the lower bottom plate, the first connection plate and the second connection plate being detachably overlaid on the rear side plate, and the fifth magnet being fixedly arranged in the second connection plate; wherein the upper cover plate main body is detachably overlaid above the first cavity; and wherein the third connection plate is detachably overlaid on the front side plate, the sixth magnet being fixedly arranged in the third connection plate.

10. The magnetic type card box assembly according to claim 9, wherein a first crease is arranged between the first connection plate and the second connection plate; wherein a second crease is arranged between the second connection plate and the upper cover plate main body; and wherein a third crease is arranged between the upper cover plate main body and the third connection plate.

11. The magnetic type card box assembly according to claim 1, wherein a side edge of the accommodation cavity is formed with a plurality of engaging grooves; and wherein a side edge of the first cover body is provided with a plurality of engaging blocks corresponding to the plurality of engaging grooves, the plurality of engaging blocks being matched with the corresponding engaging grooves respectively.

12. The magnetic type card box assembly according to claim 1, wherein four corners of the accommodation cavity are formed with accommodation grooves respectively, four seventh magnets being fixedly arranged in the corresponding accommodation grooves respectively.

13. The magnetic type card box assembly according to claim 1, wherein the adherence box comprises an outer box body arranged as a closed hollow rectangular cavity, an inner box body fixedly arranged in the outer box body and configured to place a prop, and a plurality of eighth magnets fixedly arranged between the outer box body and the inner box body, the adherence box being detachably attached onto the left side plate or the right side plate by means of the plurality of eighth magnets.

14. A magnetic type card box assembly, comprising:

a card box main body configured to place a plurality of first cards; the card box main body comprising:

a front side plate, a left side plate, a rear side plate and a right side plate arranged successively and cooperatively forming a first cavity;

a first magnet and a second magnet being fixedly arranged in the front side plate and the rear side plate respectively, a third magnet or a first iron sheet being fixedly arranged in the left side plate, and a fourth magnet or a second iron sheet being fixedly arranged in the right side plate;

a lower bottom plate arranged below the first cavity;

a cover plate detachably arranged above the first cavity;

a fifth magnet and a sixth magnet being fixedly arranged in the cover plate respectively, wherein the fifth magnet and the sixth magnet correspond to the second magnet and the first magnet respectively in position; and at least one adherence box being detachably magnetically attached onto the card box main body, and configured to place a second card and/or a game prop;

wherein the cover plate comprises a cover plate main body arranged as a dual-layer structure and detachably arranged above the first cavity, and a fifth magnet and a sixth magnet fixedly arranged in the cover plate main body respectively, the fifth magnet and the sixth magnet corresponding to the corresponding second magnet and the corresponding first magnet respectively in position; and wherein the cover plate main body comprises a first connection plate, a second connection plate, an upper cover plate main body and a third connection plate arranged successively; wherein the first connection plate has one end fixedly connected to the lower bottom plate, the first connection plate and the second connection plate being detachably overlaid on the rear side plate, and the fifth magnet being fixedly arranged in the second connection plate; wherein the upper cover plate main body is detachably overlaid above the first cavity; and wherein the third connection plate is detachably overlaid on the front side plate, the sixth magnet being fixedly arranged in the third connection plate.

15. A magnetic type card box assembly, comprising:

a card box main body configured to place a plurality of first cards; the card box main body comprising:

a front side plate, a left side plate, a rear side plate and a right side plate arranged successively and cooperatively forming a first cavity;

a first magnet and a second magnet being fixedly arranged in the front side plate and the rear side plate respectively, a third magnet or a first iron sheet being fixedly arranged in the left side plate, and a fourth magnet or a second iron sheet being fixedly arranged in the right side plate;

a lower bottom plate arranged below the first cavity;

a cover plate detachably arranged above the first cavity;

a fifth magnet and a sixth magnet being fixedly arranged in the cover plate respectively, wherein the fifth magnet and the sixth magnet correspond to the second magnet and the first magnet respectively in position; and at least one adherence box being detachably magnetically attached onto the card box main body, and configured to place a second card and/or a game prop;

wherein the adherence box comprises an accommodation cavity arranged as a hollow rectangular cavity and configured to place a second card, a first cover body detachably engaged on the accommodation cavity, and a plurality of seventh magnets fixedly arranged on the accommodation cavity respectively, the adherence box being detachably attached onto the card box main body by means of the plurality of seventh magnets.

* * * * *